June 27, 1939.  C. E. PARKER  2,164,078
STOVE
Filed March 8, 1934  2 Sheets—Sheet 1

INVENTOR.
Claude E. Parker.
BY
ATTORNEY.

June 27, 1939.         C. E. PARKER         2,164,078
STOVE
Filed March 8, 1934       2 Sheets-Sheet 2

INVENTOR.
Claude E. Parker.
BY
ATTORNEY.

Patented June 27, 1939

2,164,078

UNITED STATES PATENT OFFICE 2,164,078

STOVE

Claude E. Parker, Chicago, Ill., assignor to Gas Products Corporation, a corporation of Illinois Application March 8, 1934, Serial No. 714,613

4 Claims. (Cl. 126—41)

This invention relates to cooking apparatus or stoves and particularly to improvements therein for conserving and utilizing the heat generated incidental to the cooking of food within the stove. This invention contemplates the provision in a stove having a main cooking compartment in which food is cooked by a direct application of heat thereto with an auxiliary cooking compartment in superposed or heat transferring relation to said main cooking compartment whereby the effective temperatures of said auxiliary cooking compartment may be controlled for the purpose of warming, cooking or otherwise preparing food within the same. On account of the means provided for transferring the waste heat from the main cooking compartment to said auxiliary cooking compartment, it is unnecessary that the latter be provided with means for directly heating the same. To the end of providing an effective and commercially practicable construction for effecting such results, a stove in which it is desired to incorporate this invention may be provided with suitable insulation for reducing heat loss by radiation and for effectively insulating the auxiliary cooking compartment from the main cooking compartment so that the former will not become heated as a result of cooking food in the main cooking compartment, except at such times as is desirable.

For the purpose of utilizing waste heat from the main cooking compartment, there is provided within the stove, in which the two cooking compartments are positioned, passageways providing a vent for the heated gases of combustion from the lower cooking compartment which is disposed in heat transferring relationship to said auxiliary cooking compartment for the purpose of transferring the heat of said gases to said auxiliary cooking compartment. The stove also is provided with openings for venting the gases of combustion from the main cooking compartment from the stove without transferring the heat thereof to said auxiliary cooking compartment. For the purpose of determining the direction of flow of the products of combustion from said main cooking compartment to said opening or for the purpose of transferring the heat of said gases to said auxiliary cooking compartment, there is provided at the junction of said opening and the passageways leading to said auxiliary cooking compartment, a control means for preventing the flow of said heated gases to either said opening or passageways together with manipulative means for regulating said control.

An object of this invention, therefore, is to provide a stove having a main cooking compartment in which food is cooked by the direct application of heat thereto with an auxiliary compartment which is adapted to be heated by the waste heat from said main cooking compartment with means for controlling the transfer of heat from said cooking compartment to said auxiliary cooking compartment.

Another object of this invention is to provide a stove having a cooking compartment in which food is cooked by the direct application of heat thereto and an auxiliary cooking compartment which is heated by the utilization of waste heat from said main cooking compartment with a plurality of openings whereby the products of combustion from said main cooking compartment may be vented into the atmosphere either directly or subsequent to the transfer of heat therefrom for the purpose of heating said auxiliary cooking compartment.

Another object of this invention is to provide a stove with superposed cooking compartments in which the lower cooking compartment is provided with means for cooking food by direct application of heat thereto and the upper cooking compartment is heated by the transfer of waste heat from said lower cooking compartment, with means for regulating the transfer of waste heat from said lower to said upper cooking compartment.

A further object is to provide such a relationship between the burner, the cooking surface and the outlets for the products of combustion that all of the cooking vapors and smoke shall be consumed.

Other objects and advantages of this invention will appear from the following specification with reference to the accompanying drawings of which there are two sheets and in which.

Figure 1:
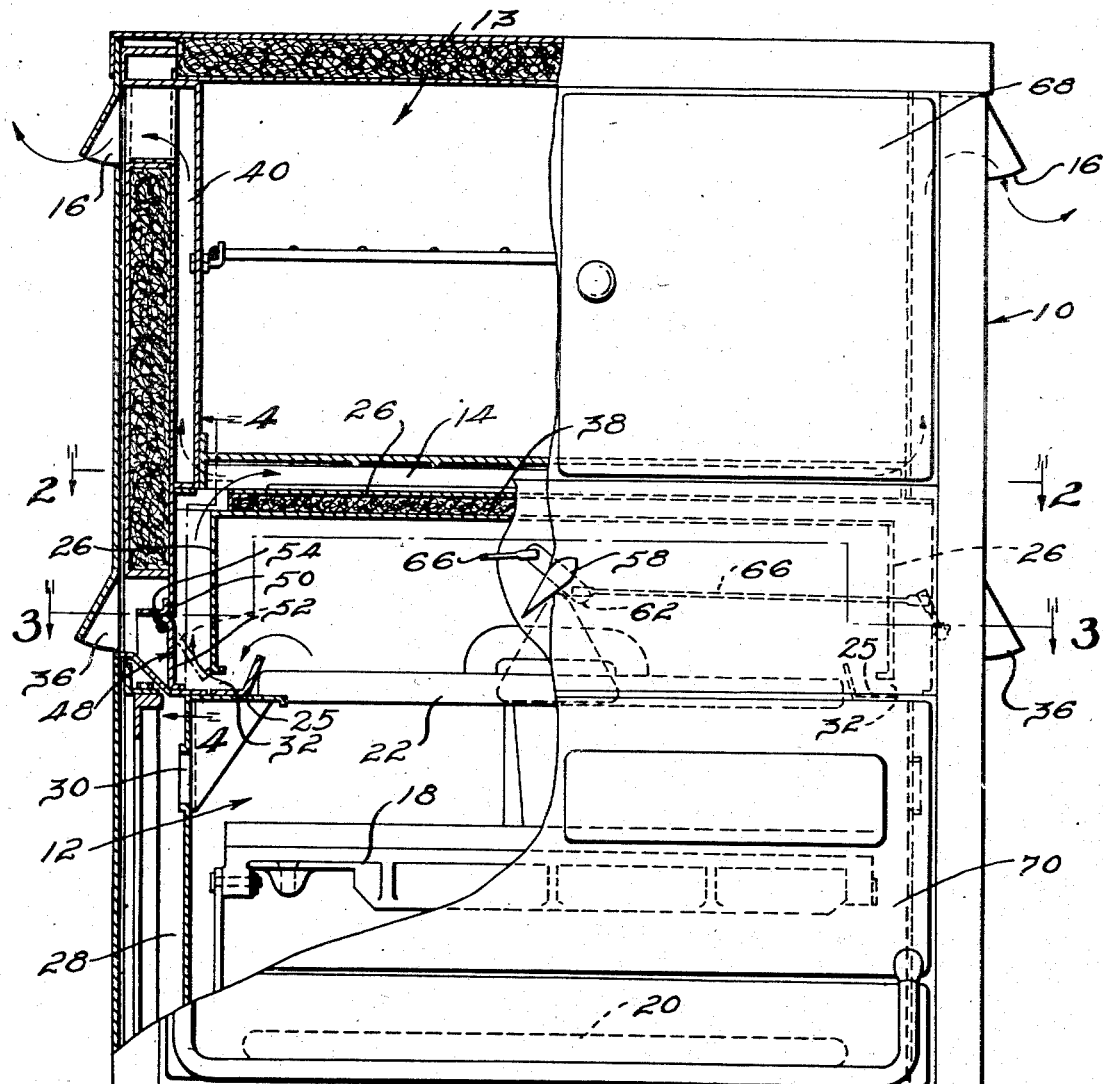
Fig. 1 is a front elevational view, partly broken away, illustrating the application of this invention to a cooking stove.

Having reference now to Fig. 1 of the drawings, there is illustrated a cooking stove 10 having a lower cooking compartment 12, in which food is cooked by the direct application of heat thereto, and an upper or auxiliary cooking compartment 13 which is adapted to be heated by the transfer of waste heat from the lower or main cooking compartment 12 to suitable passageways 14 which at one end are in communication with the upper portion of the lower cooking compartment and which are disposed about the wall of the auxiliary cooking compartment and which at the opposite ends are in communication with the atmosphere through vents 16 provided in that portion of the stove above the auxiliary cooking compartment 13.

The main cooking compartment 12 may be provided with a cooking plate 18 upon which food is adapted to be placed for the purpose of cooking the same by the direct application of heat thereto which may be provided by a pair of vertically spaced burners 20 and 22 and between which the cooking plate 18 is disposed. The lower burner 20 may be arranged to support continuously a flame for maintaining the cooking plate 18 at a desired temperature. Suitable thermostatic means may be provided for adjusting the gas opening to the lower burner 20 for regulating the size of the flame supported thereon for the purpose of maintaining the cooking plate 18 at a substantially uniform temperature. The upper burner 22 is adapted to support a downwardly projecting flame for the purpose of cooking food supported upon the cooking plate 18 and is provided with a pilot 24 whereby the upper burner may be lighted at such times as it is desirable. The spaces between the ends of the burner 22 and the side walls or linings of the cooking compartment 12 are closed by baffle plates 25 which are located substantially in the horizontal plane of the burner.

The products of combustion arising from the operation of the burners and the cooking of food upon the cooking plate 18 are compelled to pass upwardly through the plane of the upper burner 22 and into the dome formed thereabove by an inverted sheet metal dome 26 where the gases and other products of combustion are completely oxidized in their passage into and out of the dome, the temperature of which is relatively high on account of the passage of heated gases thereto.

The main cooking compartment 12 is provided with secondary air supply inlets for the upper and lower burners, one of which is provided by the passageway 28 formed between the inner and outer walls of the stove cabinet and the opening 30 provided in the inner side linings of the main cooking compartment 12.

The inverted sheet metal dome 26 providing the dome for the main cooking compartment 12 is spaced from the side walls of the stove to provide the internal passageways 14. The dome is provided with outlets 32 therefrom at the lower side thereof from whence the gases and other products of combustion may escape from the dome after they have circulated therethrough. The highly heated body of gases within the dome maintains the dome in a highly heated state and is useful in cooking whether the food is on the broiling or toasting plate 18 or within the baking oven 13. When the plate 18 is in use, the body of gases in the dome provides a highly heated blanket which extends entirely across the enclosure above the burner 22 and which radiates heat downwardly upon the plate 18. This heat, which is ordinarily lost in cooking apparatus now employed, is absorbed by the plate and conducted to the under side of the food being broiled or toasted. When baking is being done in the oven 13, the body of highly heated gases in the dome constitutes a source of heat which is conducted to the oven and thus permits the gas burner to be closed before the baking is completed, the baking being finished by the heat from the dome, with a resulting economy in the consumption of gas.

The spaces (in this particular embodiment, the openings 32) through which the gases escape from the broiling compartment are of such restricted size that the flow of air and products of combustion through the broiling compartment is correspondingly restricted and the free escape of heated air and gases prevented. That portion of the front and rear walls of the stove opposite the dome 26 is provided with sheets of insulation 34. Each side of the stove cabinet is provided with a central opening 36 opposite the dome 26 and spaced vertically a little above the outlets 32 from the dome. The outlets 36 provide openings whereby the products of combustion from the main cooking compartment 12 may be vented from the stove after their escape from the dome 26. The top of the dome 26 is covered with a sheet of insulation 38 which effectively prevents the direct transfer of heat from the dome to the upper cooking compartment 13. Between the insulation 38 and the bottom of the cooking compartment 13, suitable passageways 35 are provided which are in communication with the vertical passageways 14 alongside the dome 26 and at the other end are in communication with vertical passageways 40 formed by the side linings of the auxiliary cooking compartment 13 and the internal flue linings of the stove. The passageways 14 at their upper ends are in communication with the atmosphere by means of an opening 16 whereby the gases and products of combustion from the lower or main cooking compartment may be vented subsequent to their passage through the passageways 14.

Figure 2:
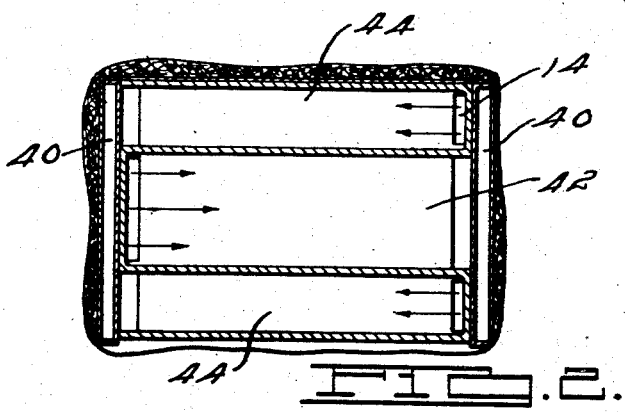
Fig. 2 is a horizontal sectional view taken in a plane on the line 2—2 of Fig. 1, looking in the direction of the arrows.
Figure 3:
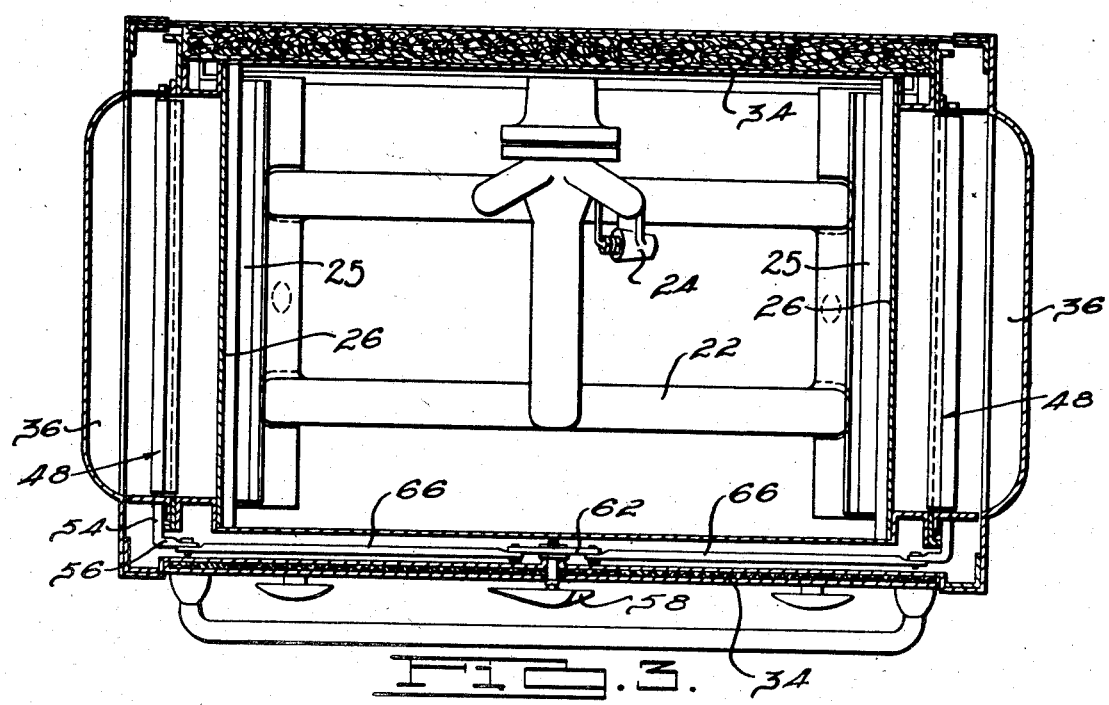
Fig. 3 is a horizontal sectional view taken generally on the line 3—3 of Fig. 1, looking in the direction of the arrows.
Figure 4:
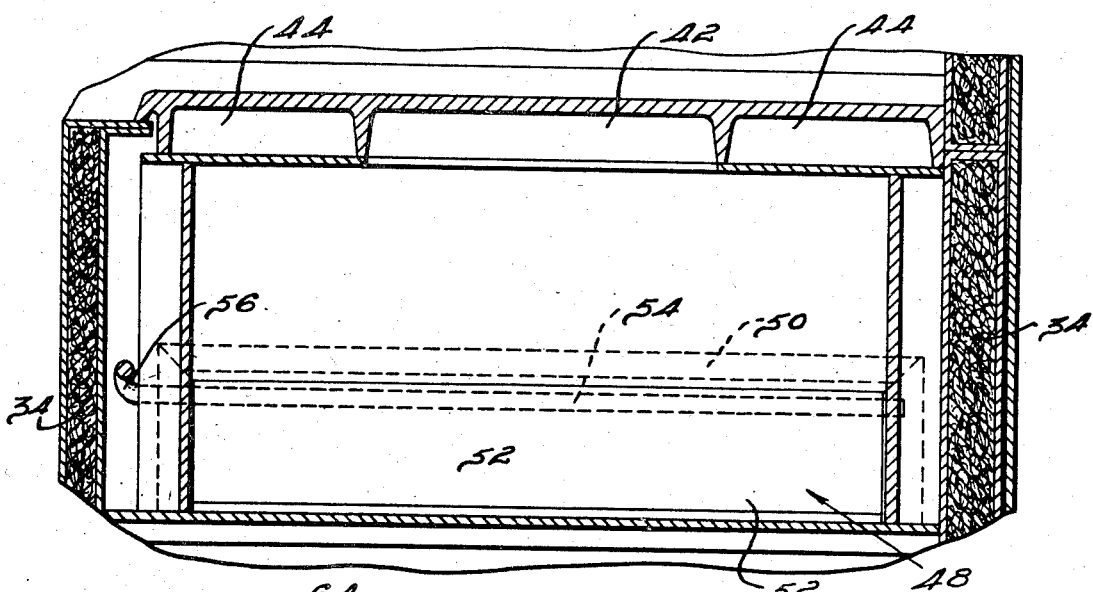
Fig. 4 is a side elevational view taken generally in a plane on the line 4—4 of Fig. 1 and illustrating the control means at the junction between the atmospheric vent and the passageways leading toward said auxiliary cooking compartment.
Figure 5:
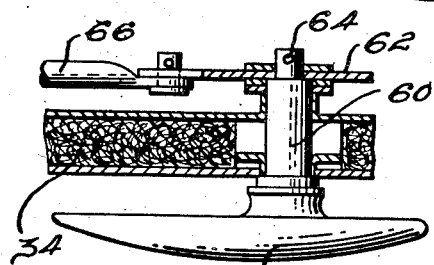
Fig. 5 is an enlarged view of the manipulative means for adjusting the control.

In Fig. 2 there are illustrated those portions of the passageways 14 formed between the insulation 38 and the bottom of the auxiliary cooking compartment 13 whereby the heated gases from the passageways 14 on the left hand side of the stove are passed through a central passageway 42 and into the vertical passageways 40 at the right hand side of the stove adjacent the upper cooking compartment 13. Similarly, the gases from the passageways 14 on the right hand side of the stove pass through outside passageways 44 where they pass into the vertical passageways 40 at the left hand side of the stove and about the upper cooking compartment 13. It will thus be seen that the gases of combustion from the lower cooking compartment may be circulated beneath the floor and about the side walls of the upper cooking compartment for the purpose of transferring the heat of such gases to said cooking compartment. The body of highly heated air and products of combustion trapped in the dome 26 tends to equalize the heat of the oven and reduces the fluctuations of temperature that occur in the ordinary range.

For the purpose of directing the flow of heated gases after their exit from the dome 26, there is provided a control 48 which comprises a shutter frame 50 which may be secured to an inside flue lining opposite the openings 36. The shutter frame 50 provides a suitable support whereby a shutter 52 may be secured to a rod 54 pivotally secured in the side flanges of the shutter frame 50. The shutter 52 is so secured to the rod 54 so as to be pivoted about the axis of the rod.

In the position in which the shutter 52 is illustrated in full lines in Fig. 1, the opening 36 is closed to the escape of gas therethrough and consequently the products of combustion, in order to escape from the stove, must pass upwardly through the passageways 14 and about the oven 13 and through the openings 16, as a result of which the upper or auxiliary cooking compartment 13 will become heated. The end of the rod 54 is bent as at 56 to provide a lever whereby the shutter 52 may be moved from one of its positions to the other.

When the shutter 52 is in its position indicated in dotted lines in Fig. 1, the passageways 14 will be closed to the entry of gas and other products of combustion escaping from the dome 26 as a result whereof such gases will escape from the stove through the opening 36. Thus, when the shutter 52 closes the entrance to passageways 14, the upper or auxiliary cooking compartment 13 cannot become heated as a result of the transfer of heat from the heated gases of combustion through the walls of the cooking compartment 13.

A front central portion of the stove is provided with an external handle 58 secured to the outer end of a rockable shaft 60 journaled in a front wall section of the stove cabinet and provided at its inner end with lever arms 62 held in place by cotter pin 64. Between each end of the lever arm 62 and the arms 56 of the shutter rods 54 there is provided a link 66 pivotally connected to each, whereby a rocking movement of the shaft 60 will, through each of the lever arms 62 and links 66, rock the shutter rod 54 upon its axis for the purpose of moving the shutter 52 from one position to the other. That portion of the front of the stove cabinet about the handle 58 may be provided with means for indicating the position of the shutter 52. It will be apparent that the shutter may be moved from one extreme position to the other, either to effect a heating of the auxiliary cooking compartment 13 or to shunt the gases and other products of combustion resulting from operation of the burners in the lower cooking compartment, from the stove to the openings 36. The link 66 connecting the arms provided on the ends of the shutter rods 56 and the arms 62 carried by the shaft 60 are disposed in a space provided between the outer front wall of the stove cabinet and the forward wall of the dome 26.

The upper cooking compartment 13 is provided with a pair of like doors 68 for closing the opening through which food may be introduced and removed from the same. The lower or main cooking compartment 12 is provided with a door 70 whereby the opening through which food is placed in and removed from the cooking compartment, may be closed. The particular embodiment herein shown of my invention is especially adapted for use in commercial establishments where it is impracticable to provide a smoke flue and where the atmosphere must be kept free from vapors and odors. With the construction herein shown, smoke and food vapors are destroyed and the need for a smoke flue obviated. However, the invention is not restricted to use in commercial cooking apparatus.

It is to be understood that the invention is not to be considered as limited to the embodiment and application thereof which has been selected here for the purpose of illustration, but is intended rather to embrace and include all other embodiments and applications of the new and useful principles thereof which are to be considered reasonably within the scope of the appended claims. The invention is claimed broadly in my copending application Serial No. 676,795, filed June 21, 1933.

I claim:

1. A smokeless and odorless broiling stove comprising walls forming an enclosing casing, a support for the food to be cooked, a horizontally arranged burner above said support, horizontal baffle means in said casing in the plane of the burner to direct distillates from the food away from the casing walls and toward the burner, a metallic dome above the burner which traps products of combustion and unconsumed distillates and subjects such distillates to the heat within said dome, the heat within the dome also being radiated downwardly upon said support, means below the dome to permit the escape of the products of combustion, and means below the burner to admit secondary air to support combustion.

2. A smokeless and odorless broiling stove comprising walls forming an enclosing casing, a support for the food to be cooked, a horizontally arranged burner located centrally above said support, horizontal baffle means in said casing in the plane of the burner to direct distillates from the food away from the casing wall and toward the burner, a metallic imperforate dome above the burner which traps products of combustion and unconsumed distillates and subjects such distillates to the heat within said dome, the heat within the dome also being radiated downwardly upon said support, there being passages between the sides of the dome and the casing through which the products of combustion escape after leaving the dome beneath the edges of the latter, and means below the burner to admit secondary air to support combustion.

3. A smokeless and odorless broiling stove comprising walls forming an enclosing casing, a support for the food to be cooked, a horizontally arranged burner above said support, horizontal baffle means in said casing in the plane of the burner to direct distillates from the food away from the casing walls and toward the burner, a metallic dome above the burner which traps products of combustion and unconsumed distillates and subjects such distillates to the heat within said dome, the heat within the dome also being radiated downwardly upon said support, said casing providing an oven above the dome, means below the dome to permit the escape of the products of combustion from the dome to the oven, and means below the burner to admit secondary air to support combustion.

4. In a cooking stove, a cabinet comprising a frame, sheet metal panels secured to said frame for enclosing the space therein and forming side walls of a cooking compartment, a sheet metal dome closed at the top and sides and open at the bottom, said dome being surrounded by certain of said panels and being disposed above said compartment in communication therewith, a source of heat adjacent the upper end of said compartment, an outlet from said dome, baffle members extending transversely of said compartment at substantially the same elevation as said source of heat, a support beneath said source and within said compartment for supporting food to be cooked by radiant heat emanating from said source, said baffle members affording a restriction to the flow of gases from said compartment into said dome and being adapted to direct into said dome and past said source the gaseous and odoriferous substances resulting from cooking, said outlet from said dome being arranged to restrict the flow of said gaseous and odoriferous substances from said dome to maintain said substances in a highly heated state within said dome to be there resubjected to the heat from said source until the oxidization of said substances is substantially completed.

CLAUDE E. PARKER.